United States Patent
Stanke

[15] 3,666,254
[45] May 30, 1972

[54] SINTERING MACHINE
[72] Inventor: Walter Stanke, Essen, Germany
[73] Assignee: Heinrich Koppers Gesellschaft mit beschrankter Haftung, Essen, Germany
[22] Filed: May 20, 1970
[21] Appl. No.: 39,057

[30] Foreign Application Priority Data
May 30, 1969 Germany................P 19 27 537.7

[52] U.S. Cl..................................................266/21
[51] Int. Cl.................................................F27b 21/06
[58] Field of Search...................75/3, 5, 6, 7; 266/20, 21

[56] References Cited

UNITED STATES PATENTS

| | | | |
|---|---|---|---|
| 3,201,102 | 8/1965 | Stieler et al. | 226/21 |
| 3,141,544 | 7/1964 | Hansen | 266/21 |
| 2,364,586 | 12/1944 | Morgan | 266/21 |
| 1,764,696 | 6/1930 | Shallock | 266/21 |
| 3,102,153 | 8/1963 | Stieler et al. | 266/21 |

Primary Examiner—Gerald A. Dost
Attorney—Michael S. Striker

[57] ABSTRACT

A sintering machine including a travelling grate formed by a plurality of pallets which are moved along an endless path defined by an upper and a lower support portion connected at the discharge end of the machine by an arcuate portion. The pallets are pushed along the upper support portion toward the discharge end, and the pallets are arranged end-to-end with the exception of the safety gap between the pallets which are at any instant at the junction of the end of the upper support portion and the arcuate portion adjacent thereto. Means are provided which engage the pallet located at any instant upstream of the safety gap for smoothly moving the pallet into engagement with the pallet downstream of the gap.

10 Claims, 2 Drawing Figures

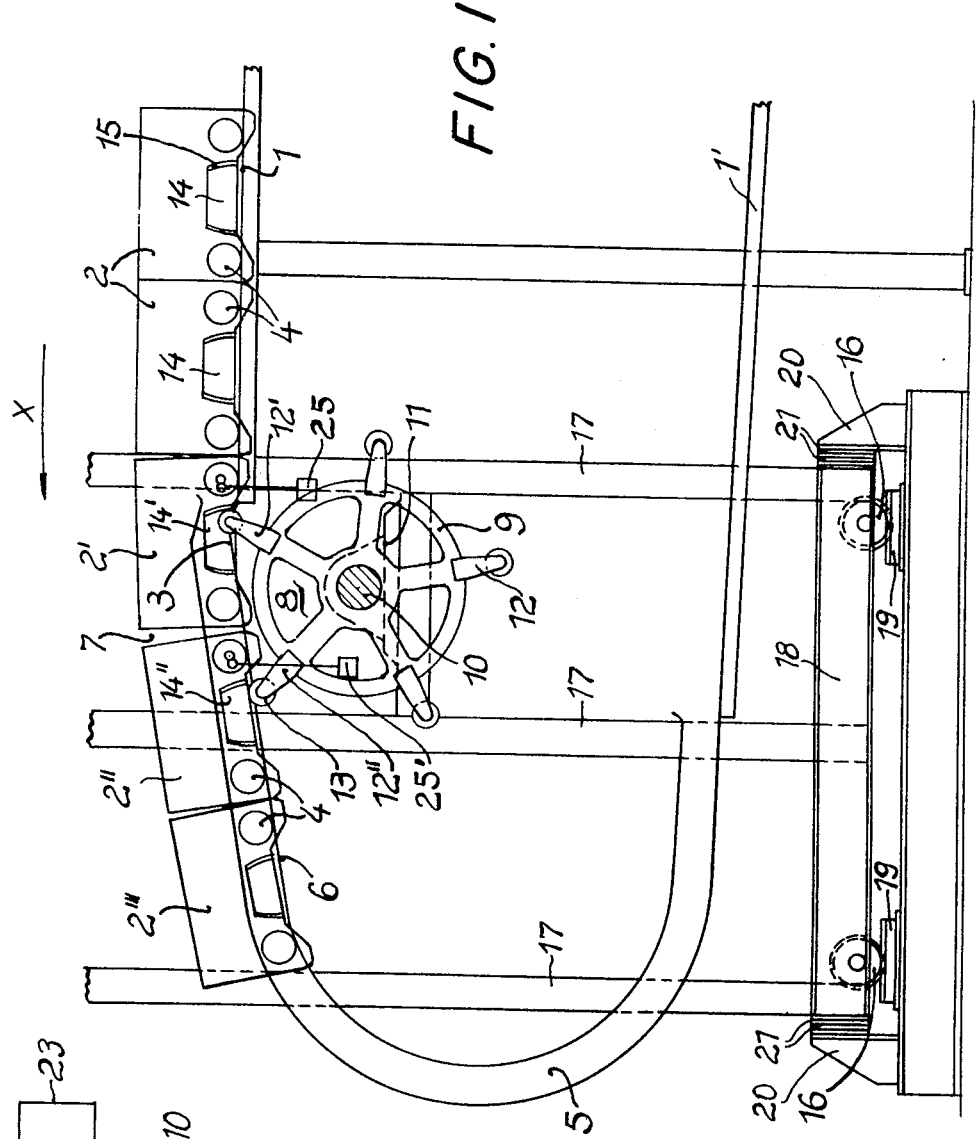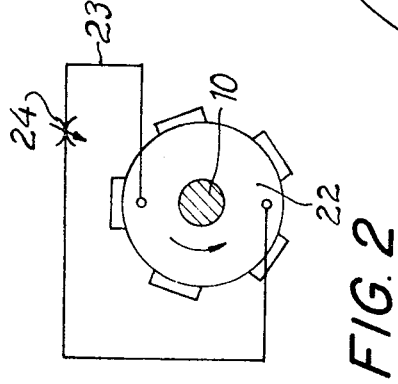
INVENTOR
HALTER STANKE
BY
ATTORNEY

SINTERING MACHINE

BACKGROUND OF THE INVENTION

The present invention relates to a sintering machine with a travelling grate formed by a plurality of pallets which are moved along an endless path defined by an upper and a lower support portion connected at the discharge end of the machine by an arcuate portion and in which the pallets are moved in a known manner at the inlet end of the grate by a sprocket wheel engaging the pallets so as to push the same in abutting relationship along the upper support portion towards the discharge end of the machine at which the pallets are guided by the arcuate support portion connecting the upper to the lower support portion onto the latter.

Since the pallets which support the hot sintering material will expand during operation of the machine in longitudinal direction thereof, that is in the direction of the movement of the pallets, it is necessary to maintain at the discharge end of the sintering machine, that is at the transition of the upper support portion to the arcuate support portion a sufficient safety gap between the pallet upstream of the transition point, that is the last pallet of the end-to-end arranged pallets which are pushed toward the discharge end of the machine and the first pallet downstream of the transition point which are already supported on the arcuate portion at the discharge end of the machine. This results in sintering machines according to the prior art in the disadvantage that a relatively large safety gap had to be maintained at the start of the machine until, due to heat expansion of the pallets during the operation of the machine, this safety gap was shrinking to the desired width. Changes of the gap width may also occur during operation of the machine whenever the machine is stopped for a shorter or longer period whereby the temperature of the pallets will be changed so that the same will be subjected to a change of length.

SUMMARY OF THE INVENTION

It is an object of the present invention to provide, in a sintering machine of the aforementioned kind in which a safety gap is provided between adjacent pallets at the discharge end of the machine, means preventing during operation of the machine the pallet upstream of the safety gap to engage the pallet downstream of the safety gap with an impact.

It is a further object of the present invention to provide for an arrangement in which the safety gap may be maintained substantially at a predetermined width, regardless of the heat expansion of the pallet chain.

It is an additional object of the present invention to provide for an arrangement of the aforementioned kind which is composed of relatively few and simple parts so that the arrangement will operate trouble-free under extended use.

With these and other objects in view, which will be evident from the following description, the present invention mainly comprises a sintering machine including an elongated travelling grate comprising a plurality of pallet means and support means supporting the pallet means for movement along an endless path having an upper support portion, a lower support portion and an arcuate portion connecting the upper to the lower support portion at the discharge and of the machine, the pallet means being pushed in one direction along the upper support portion toward the discharge end thereof so as to abut with opposite ends against each other to thus form an endless grate with the exception of a safety gap arranged at the junction of the upper support portion to the arcuate portion permitting expansion of the grate, and means engaging the pallet means which at any instant is upstream of the safety gap for moving this pallet means without any jolt into engagement with the pallet means downstream of the gap.

Preferably, the arcuate portion at the discharge end of the machine and the engaging means are movable in longitudinal direction of the grate.

The aforementioned engaging means may be constructed in various different ways. In a preferred arrangement according to the present invention, the engaging means comprises wheel means rotatable about an axis substantially normal to the longitudinal direction of the grate and having circumferentially spaced radially projecting portions adapted to engage into pocket means provided on each of the pallet means.

While it is possible to provide the wheel means of the engaging means with a positive drive rotating in synchronism with a driven or sprocket wheel located in the region of the inlet end of the machine and cooperating with the pallet means to push the latter along the upper support portion toward the discharge end of the machine, it has been ascertained that such a positive drive of the engaging means is not necessary. According to a preferred arrangement of the present invention, the wheel means of the engaging means are moved only by engagement with the pallet means at the discharge end of the machine and in such an arrangement the wheel means of the engaging means are braked to assure a smooth transfer of the pallet means upstream of the gap onto the pallet means downstream thereof.

The engaging means according to the present invention will thus prevent impact of the pallets against each other so that wear on the arcuate portion of the support, the wheels, the axles and the pallets per se will be reduced. The engaging means will further assure a proper guiding of the pallets at the discharge end of the machine, which by the engaging means will be properly aligned in the direction of movement of the grate. In other words, the engaging means at the discharge end of the machine will have in this respect the same function as the lifting or sprocket wheels at the inlet or drive end of the grate.

Since, as already mentioned, the engaging means together with the arcuate support portion at the discharge end of the machine are adjustable in longitudinal direction of the grate, it is possible to adjust the desired width of the safety gap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic partial side view illustrating the discharge end of the sintering machine according to the present invention; and FIG. 2 is a schematic view of the braking means connected to the engaging means of the machine according to the present invention.

DESCRIPTION OF THE PREFERRED EMBODIMENTS

FIG. 1 illustrates the discharge end of the sintering machine according to the present invention. As can be seen from FIG. 1, the pallets 2 of the travelling grate of the sintering machines are moved on the upper support or track portion 1 of the machine in end-to-end abutting relationship in the direction of the arrow $x$ by conventional means, for instance sprocket wheels driven by a prime mover at the inlet end of the machine and cooperating with pockets 14 respectively provided on opposite sides and in the bottom region of each pallet. These drive means are conventional and are therefore not shown in the drawing. A cam portion 3 is provided at the left end, as viewed in FIG. 1, of the upper horizontal track portion 1 over which the wheels 4 of the pallets 2 have to be pushed before the pallets may move downwardly by gravity over the inclined portion 6 of the support or track means which is fixedly connected to and forms part of the arcuate connecting portion 5 which leads from the upper horizontally arranged support or track portion 1 to the lower support or track portion 1'. The latter, as shown in FIG. 1, is slightly inclined toward the right or inlet end of the sintering machine. Between the last pallet 2' of the pushed end-to-end abutting pallet chain and the first pallet 2'' which moves downwardly under the influence of gravity on the inclined track portion 6 is a safety gap 7, the width of which may vary during the operation of the machine, which however should be maintained substantially at a predetermined width at this transition point. It is to be understood that pallets are arranged end-to-end on the connecting portion 5 and the lower track portion 1', but for simplification reason these pallets are not shown in the drawing.

To prevent impact of the pallet 2' onto the pallet 2'', engaging means 8 are provided in the region of the safety gap 7. The engaging means 8 may comprise a pair of wheels 9, only the front one being shown in the drawing, which are fixed to a shaft 10 having an axis normal to the direction of movement of the pallets 2. The shaft 10 is mounted on bearings 11 and the latter are supported on a frame including upright struts 17 which also support the inclined track portion 6 and the arcuate track portion 5. The lower ends of the struts 17 are fixedly connected to a carriage 18, having wheels 16 which are mounted on short rail portions 19 for movement in longitudinal direction of the grate formed by the pallets 2. Fixed abutment means 20 are respectively provided adjacent to, but spaced from, opposite ends of the carriage 18 and a plurality of spacer plates 21 are sandwiched between face portions of the abutment means 20 and the respective opposite ends of the carriage 18 so as to hold the carriage 18, the frame supported thereby and the engaging means 8 as well as the track portions 5 and 6 in a predetermined position relative to the stationary upper and lower track portions 1 and 1'. By removing one or a plurality of the spacer plates 21 from one of the ends of the carriage 18, the latter may be slightly moved in longitudinal direction to one side or the other and by then inserting the spacer plate or plates between the other end of the carriage 18 and the abutment means 20 adjacent thereto, the carriage 18 and the elements supported thereby may then be fixed again in the thus adjusted position.

In the illustrated embodiment each of the wheels 9 of the engaging means has five circumferentially spaced radially projecting portions or arms 12 each of which carries at the outer end thereof a roller 13. The arms and the rollers thereon are dimensioned in such a manner that they may engage with ample clearance into the pockets 14 provided on the pallets 2. In the position of the various elements shown in the drawing, the arm 12'' is ready to move out of the pocket 14'' of the pallet 2'' after the latter has moved in abutment relationship with the preceding pallet 2'''. At the same time, the arm 12' enters into the pocket 14' of the pallet 2' upstream of the safety gap 7 without, however, yet engaging the right side wall 15 of the pocket. Only after the pallet 2' is slightly pushed further in the direction of the arrow x will the aforementioned side wall of the pocket 14' bear against the roller on the arm 12' to thereby turn the latter together with the wheel 9 in counterclockwise direction. As soon as the rear wheel of the pallet 2' has past the cam portion 3, it will move under the influence of gravity downwardly along the inclined track portion 6 and would therefore engage the pallet 2' with a considerable impact. To prevent such an impact, braking means are connected to the engaging means 8 to brake rotation of the latter to thereby brake movement of the pallet 2' and to assure abutment of the latter against the pallet 2'' without any jolt or impact.

Such braking means may include an oil pump 22 fixed to the shaft 10 for rotation therewith, a closed conduit loop 23 through which the oil pumped by the pump 22 is circulated and in which throttling means 24 are provided, which are preferably adjustable, so that the force necessary to drive the oil through the throttling means 24 of the closed circuit will provide a braking force on the wheel 9.

As mentioned before, the size of the safety gap 7 will vary during operation of the machine and will mainly depend on the temperature of the pallets. Preferably, the arrangement according to the present invention includes therefore also measuring means for continuously measuring the width of the safety gap 17. Such measuring means may for instance include a pair of contact means 25 and 25' stationarily mounted by means not shown in the drawing at a distance from each other to simultaneously engage portions, for instance projecting shaft portions of the rear wheels of the pallets, to opposite sides of the safety gap 7 when the latter has a predetermined width. These contact means may be connected in a known manner, not forming part of the present invention, in circuit with an indicating or signal device in such a manner that the latter will not be energized when both contact means are simultaneously actuated, that is when the safety gap 7 has its predetermined width, but to actuate the signal device in one or the other way whenever the contact 25' is actuated either before or after actuation of the contact 25, to thereby indicate that the width of the safety gap is smaller, respectively larger than the predetermined width. When such a signal occurs, the operator may adjust the safety gap and the position of the engaging means 8 by changing the position of the carriage 18 in the manner as described before.

It will be understood that each of the elements described above, or two or more together, may also find a useful application in other types of a sintering machine differing from the types described above.

While the invention has been illustrated and described as embodied in a sintering machine provided with a safety gap in the pallet chain forming the grate of the sintering machine and with means assuring a smooth transition of the pallets through the safety gap, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a sintering machine, a combination comprising an elongated travelling grate having a discharge end and comprising a plurality of pallet means and support means supporting said pallet means for movement along an endless path defined by an upper support portion, a lower support portion, and an at least partly curved connecting portion connecting said upper to said lower support portion at said discharge end, said pallet means being pushed in one direction along said upper support portion toward said discharge end so as to abut with opposite ends against each other with the exception of a safety gap arranged in the region of the junction of said upper support portion and said connecting portion; and means engaging that pallet means which at any instance is upstream of said gap for moving said pallet means without any jolt into engagement with the pallet means downstream of said gap, while becoming disengaged from said pallet means downstream of said gap so as to free the downstream pallet means for movement exclusively under the influence of gravity along said connecting portion onto said lower support portion.

2. A combination as defined in claim 1, and including mounting means mounting said connecting portion and said engaging means movable in longitudinal direction of said grate relative to the upper and lower support portions.

3. A combination as defined in claim 2, wherein said mounting means comprise a carriage having opposite ends, stationary means mounting said carriage movable in longitudinal direction of said grate, a pair of abutment means on said stationary means respectively arranged spaced from and facing said opposite ends of said carriage, and a plurality of spacer means selectively insertable between said abutment means and said opposite ends of said carriage for adjusting the position of the latter with respect to the stationary means and therewith the position of said engaging means and that of said connecting portion.

4. A combination as defined in claim 1, and including pocket means on each of said pallet means, said engaging means comprising wheel means rotatable about an axis substantially normal to the longitudinal direction of said grate and having circumferentially spaced radially projecting portions adapted to engage into said pocket means of said pallet means.

5. A combination as defined in claim 4, wherein said pocket means are open at the bottom thereof, and wherein said axis of said wheel means is arranged in a plane substantially parallel and at an elevation below that of said upper support portion.

6. A combination as defined in claim 4, wherein said wheel means are turned about the axis thereof only by engagement of said projecting portions thereof with said pocket means, and including means cooperating with said wheel means for braking rotation thereof about said axis.

7. A combination as defined in claim 6, wherein said braking means comprise pump means connected to said wheel means for rotation therewith, endless conduit means connected to said pump means for circulating liquid therethrough during operation of said pump means, and throttling means in said conduit means for throttling passage of the liquid therethrough.

8. In a sintering machine, a combination comprising an elongated travelling grate having a discharge end and comprising a plurality of pallet means and support means supporting said pallet means for movement along an endless path defined by an upper support portion, a lower support portion and an at least partly curved connecting portion connecting said upper to said lower support portion at said discharge end, said pallet means being pushed in one direction along said upper support portion toward said discharge end so as to abut with said opposite ends against each other with the exception of a safety gap arranged in the region of the junction of said upper support portion and said connecting portion, each of said pallet means having pocket means open at the bottom thereof; and means engaging that pallet means which at any instance is upstream of said gap for moving said pallet means without any jolt into engagement with the pallet means downstream of said gap, said engaging means comprising wheel means rotatable about an axis substantially normal to the longitudinal direction of said grate in a plane substantially parallel and at an elevation below that of said upper support means and having circumferentially spaced radially projecting arms each carrying a roller at the outer free ends thereof adapted to engage into said pockets means said pallet means.

9. In a sintering machine, a combination comprising an elongated travelling grate having a discharge end and comprising a plurality of pallet means and support means supporting said pallet means for movement along an endless path defined by an upper support portion, a lower support portion and an at least partly curved connecting portion connecting said upper to said lower support portion at said discharge end, said pallet means being pushed in one direction along said upper support portion toward said discharge end so as to abut with opposite ends against each other with the exception of a safety gap arranged in the region of the junction of said upper support portion and said connecting portion; and means engaging that pallet means which at any instance is upstream of said gap for moving said pallet means without any jolt into engagement with the pallet means downstream of said gap and comprising rotatable wheel means having projecting portions adapted to engage with said pallet means, braking means cooperating with said wheel means for braking its rotation, said braking means comprising pump means connected to said wheel means for rotation therewith, endless conduit means connected to said pump means for circulating fluid liquid therethrough during operation of said pump means, and throttling means in said conduit means for throttling passage of the liquid therethrough.

10. In a sintering machine, a combination, comprising an elongated travelling grate having a discharge end and comprising a plurality of pallet means and support means supporting said pallet means for movement along an endless path, defined by an upper support portion, a lower support portion, and an at least partly curved connecting portion connecting said upper to said lower support portion at said discharge end, said pallet means being pushed in one direction along said upper support portion toward said discharge end so as to abut with opposite ends against each other with the exception of a safety gap arranged in the region of the junction of said upper support portion and said connecting portion; means engaging that pallet means which at any instance is upstream of said gap for moving said pallet means without any jolt into engagement with the pallet means downstream of said gap; mounting means mounting said connecting portion and said engaging means movable in longitudinal direction of said grate relative to the upper and lower support portions; and means for continuously measuring the size of said safety gap and for indicating whenever said gap deviates essentially from a predetermined size so that said engaging means and said connecting portion may be moved in longitudinal direction of said grate to adjust said gap.

* * * * *